United States Patent [19]

Teshima et al.

[11] Patent Number: 4,614,083
[45] Date of Patent: Sep. 30, 1986

[54] GAS TURBINE

[75] Inventors: Kiyomi Teshima, Okayama; Yukimasa Kajitani, Tamano; Kazuo Takeya, Kawasaki; Takuya Miyagawa, Kobe, all of Japan

[73] Assignee: Agency of Industrial Science & Technology, Tokyo, Japan

[21] Appl. No.: 711,337

[22] Filed: Mar. 13, 1985

[30] Foreign Application Priority Data

Apr. 6, 1984 [JP] Japan .................................. 59-67525
Apr. 6, 1984 [JP] Japan .................................. 59-67526

[51] Int. Cl.$^4$ .............................................. F02C 7/00
[52] U.S. Cl. ...................................... 60/39.53; 60/728
[58] Field of Search ............... 60/39.53, 728, 39.37, 60/262, 39.19, 39.58, 39.59; 415/114

[56] References Cited

U.S. PATENT DOCUMENTS

| | | | |
|---|---|---|---|
| 2,592,060 | 4/1952 | Oulianoff | 60/39.37 |
| 3,280,555 | 10/1966 | Charpentier et al. | 60/39.53 |
| 3,418,810 | 12/1968 | Cresswell et al. | 60/262 |
| 3,657,884 | 4/1972 | Hugoson | 60/39.37 |
| 3,842,597 | 10/1974 | Ehrich | 60/728 |
| 3,949,549 | 4/1976 | Holl | 60/728 |
| 3,978,658 | 9/1976 | Forbes et al. | 60/39.37 |
| 4,195,474 | 4/1980 | Bintz et al. | 60/39.37 |
| 4,338,780 | 7/1982 | Sakamoto et al. | 60/728 |

FOREIGN PATENT DOCUMENTS

| | | | |
|---|---|---|---|
| 55-32930 | 3/1980 | Japan | 60/728 |
| 2034822 | 6/1980 | United Kingdom | 60/728 |

Primary Examiner—Louis J. Casaregola
Assistant Examiner—Donald E. Stout
Attorney, Agent, or Firm—Armstrong, Nikaido, Marmelstein & Kubovcik

[57] ABSTRACT

A gas turbine is disclosed, in which a portion of compressed air from a compressor of the turbine is cooled by water and the cooled compressed air is utilized for cooling a region at or about the turbine inlet, and in which the interior of a combustor chamber into which the compressed air from the compressor is introduced is divided by a partition wall into a combustor part and a transition piece part and air cooling pipes are provided through the partition wall, each air cooling pipe being provided with nozzles through which to jet water to positively and effectively cool the compressed air while it passes through the air cooling pipe.

3 Claims, 9 Drawing Figures

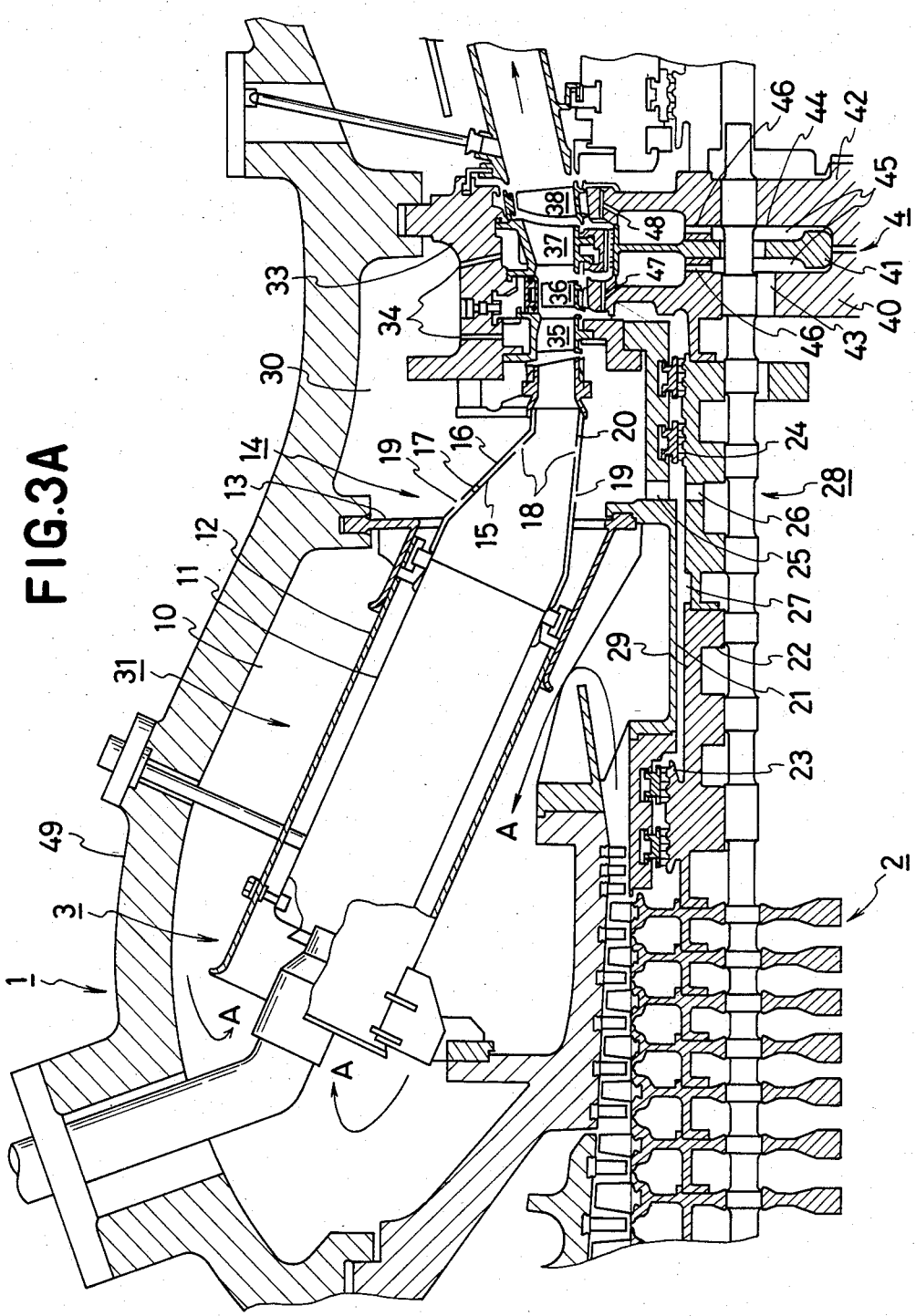

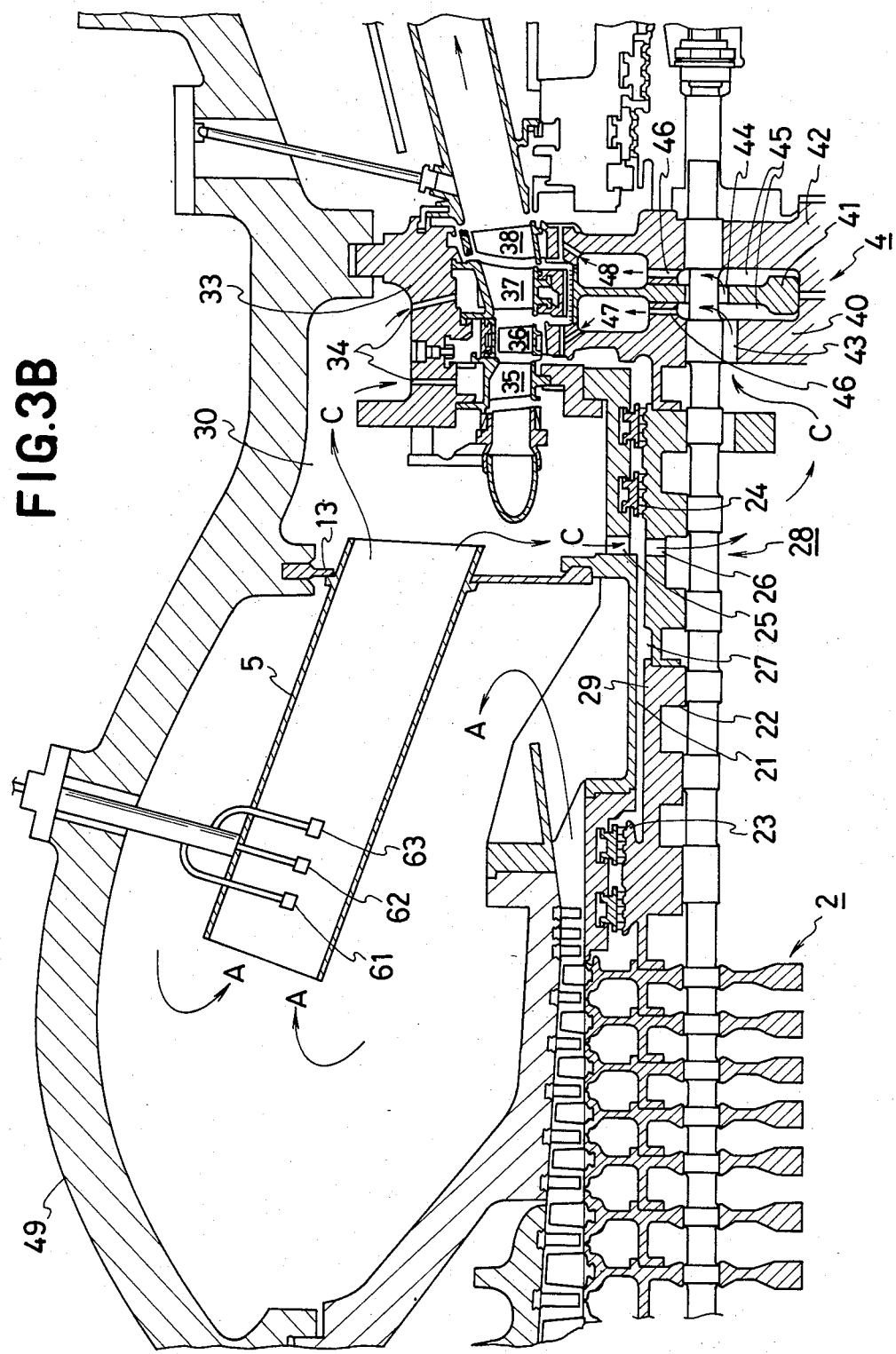

GAS TURBINE

BACKGROUND

The present invention relates to a gas turbine, and more particularly, a gas turbine having means for effectively cooling with atomized water a portion of compressed air for cooling an inlet part of the turbine.

Generally in connection with gas turbines, it is known that the operation efficiency of the turbine can be improved by raising the temperature of the driving fluid at the turbine inlet, and it is widely practiced in the today art to obtain a high temperature of the driving fluid at the turbine inlet so as to enhance the turbine efficiency.

However, by raising the temperature at or about the turbine inlet, it tends to occur that heat-resistant members disposed about the turbine inlet undergo a lowering in strength or a thermal stress, whereby it is likely that the use life of various devices at or around the turbine inlet is adversely affected. In view of this, it has already been proposed and operated in actuality to cool a part of the gas turbine around its gas inlet by a portion of the compressed air supplied from a compressor of the gas turbine. To increase the amount of the compressed air for cooling, however, is prone to accompany a sacrifice of the operation efficiency of the turbine, so that the use amount of the cooling compressed air should preferably be limited to an effective minimum value. Then, in order to suppress the use amount of the cooling compressed air, it is advantageous to cool the air.

As means for cooling the compressed air for cooling, such a method has already been reduced to practice which makes use of a cooling device provided separately of the gas turbine. A more effective method will be to effect the cooling by jetting water inside the casing of the gas turbine.

In the case of the former of the above two methods of cooling, the arrangement of the cooling device and associated piping tends to be complex and the pressure loss through the piping tends to be disadvantageously great.

In the case of the latter, then, it is likely that water becomes attached to various members and devices around the turbine inlet to give rise to generation of cracking due to a thermal impact, so that it in this case is important to effectively cause a large amount of water to be vaporized in a limited space within the turbine casing.

SUMMARY

In view of the above, the present invention is directed in its object to positively and effectively cool the cooling air for the gas turbine by having water effectively evaporated in the turbine casing.

To attain the object, the present invention provides a gas turbine which is of the type in which compressed air from a compressor is introduced into a combustion chamber and a portion of the compressed air is utilized for cooling a region at or about the turbine inlet, and which is characterized in that the combustion chamber is divided by a partition wall into a combustor part and a transition piece part, that air cooling pipes are provided through the partition wall, and that nozzles for jetting water are provided to the air cooling pipes.

According to the present invention having structural characteristics as briefly referred to above, it is feasible to effectively cool the compressed air passed through the air cooling pipes, through a positive utilization of the latent heat of vaporization of water. The water is jetted in an atomized form through nozzles within the air cooling pipes, so that it can be completely vaporized through its passage through the cooling pipes.

According to the above arrangement proposed by the present invention, atomized fine particles of water do not directly contact the members and devices about the turbine inlet, which can therefore be prevented from undergoing a difficulty, for example a cracking likely when a thermal impact is given them.

Also, now that the compressed air from the compressor of the gas turbine, which is utilized as means for cooling the turbine, is cooled during its passage through air cooling pipes, if the temperature about the turbine inlet is raised it is feasible to effectively cool a region about the gas inlet of the turbine, so that the generation can be avoided of any large thermal stress due to a thermal impact.

In other words, according to the present invention it is possible to raise the temperature at the inlet of a gas turbine to effectively enhance the thermal efficiency of the gas turbine.

To add to the above, the arrangement proposed according to the present invention is so simple as to be such that water jetting nozzles are provided to air cooling pipes secured through a partition wall, so that not only the means for cooling the compressed air can be only of a compact structure but also the pressure loss of the cooling air through the air cooling means can be advantageously suppressed.

The above and other features and advantages of the present invention will become apparent from considering the following description of the preferred embodiments of the invention, taken in conjunction with the accompanying drawings.

DRAWINGS

FIGS. 3A and 3B are respectively a sectional view, showing in enlargement essential portions of the gas turbine shown in FIG. 1;

PREFERRED EMBODIMENTS

Now, the present invention will be described in greater detail in connection with the preferred embodiments thereof illustrated in the accompanying drawings.

Figure 1:
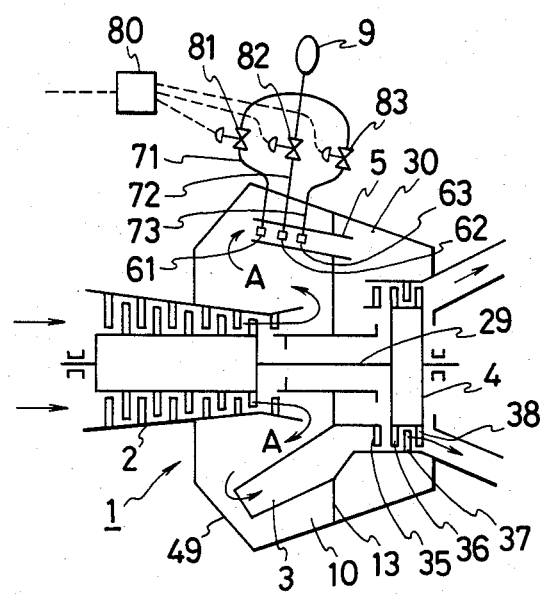
FIG. 1 is a view schematically showing a gas turbine embodying the present invention, of which a lower half portion corresponds to the section taken on line A—A in FIG. 2 and an upper half portion does to the section on line B—B in FIG. 2.

As shown in FIG. 1, a gas turbine 1 according to a first embodiment of the invention is provided with a compressor 2, combustors 3 and a turbine 4. The compressor 2 has a turbine shaft 29 in common with the turbine 4, and operates to produce compressed air A, which is sent into a combustor chamber 10 encased by a casing 49 and of which a major portion is introduced into combustors 3 disposed in the chamber 10 and therein consumed for combustion of fuel.

The combustion gas from combustors 3 is supplied to drive the turbine 4 comprising stator blades 35 and 37 and rotor blades 36 and 38 and thereby to drive the turbine shaft 29 to rotate to drive a generator (not shown) to generate electric power.

As shown in FIG. 3A, stator blades 35 and 37 of the turbine 4 are secured around a ring 33 in the turbine casing 49, and the rotor blade 36 located adjacent to the stator blade 35 is secured to a disk 40, while the rotor blade 38 adjacent to the stator blade 37 is secured to another disk 42.

As seen from FIG. 1, the interior of the turbine casing 49 is divided by a partition wall 13 into the combustor chamber 10 and a cooling air chamber 30. As shown in detail in FIG. 2, the partition wall 13 is composed of a number of support plates 13a respectively for supporting one of combustors 3, and as shown in FIG. 3A, the support plate 13a divides the combustor 3 into a combustor part 31 and a transition piece part 14.

While the combustor part 31 comprises an inner cylinder 11 and an outer flow guide 12, the transition piece part 14 comprises a dual-wall cylinder structure formed of an inner cylinder 15 and an outer cylinder 16 having a spacer 17 disposed therebetween and defining an open space 20 therebetween. The outer cylinder 16 is formed with a number of small through-holes 19 permitting entry of the compressed air A into the open space 20. Likewise, the inner cylinder 15 is provided with a number of small bores 18.

Figure 2:
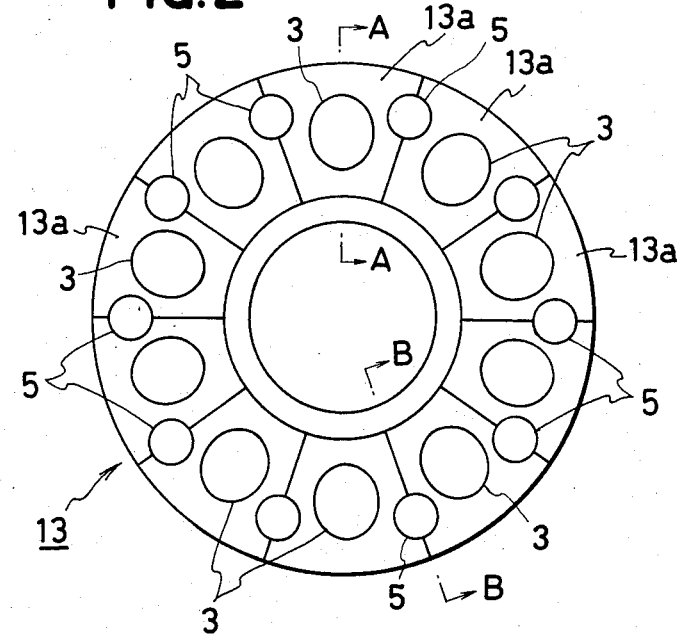
FIG. 2 shows a front elevation of a partition wall, taken for illustration of the relative arrangement of combustors and air cooling pipes.

As shown in FIG. 1, then, a number of air cooling tubes 5 are provided through the partition wall 13, each tube being supported by adjacent support plates 13a and 13a as shown in FIG. 2 and connecting to each other the combustor chamber 10 and the cooling air chamber 30. As best seen from FIG. 3B, the air cooling tube 5 is provided with a plurality of water jetting nozzles 61, 62 and 63 disposed at prescribed intervals, which should preferably be mounted at a point or points as close as possible to the upstream end of the tube 5 in the flow direction of the compressed air so that jetted water can be vaporized as completely as possible. As shown in FIG. 1, nozzles 61, 62 and 63 are connected to a water supply source 9 respectively through pipes 71, 72 and 73, which respectively intermediately have valves 81, 82 and 83 controlled to open or close commonly by a controller 80. The controller 80 is preparatively put-in with the data on the output of the gas turbine, and when the output of the turbine lowers below the rated value, the valves 81, 82 and 83 may be successively closed to accordingly progressively suppress the amount of water to be jetted.

The above-mentioned ring 33 for supporting stator blades 35 and 37 is provided with two air passage bores 34, one of which communicates with the interior of the blade 35, while the other communicating with the interior of the other stator blade 37. Further, as shown in FIGS. 3A and 3B, between a connecting member 21 and a torque tube 22 structurally and operatively associated with the turbine shaft 29, there is formed an open space sealed by seal rings 23 and 24, the former at the high pressure side of the compressor and the latter at the side of the turbine inlet. By means of extraction bores 25 and 26 in communication with each other, the interior of the cooling air chamber 30 and an open space 28 in the torque tube 22 are in communication with each other.

The disk 40 thereon supporting the rotor blade 36 is provided with a cooling-air passage bore 47, which is communicated on the one hand with the interior of the blade 36 and on the other hand with a first portion of an open space 45 formed between the disk 40 and a spacer disk 41 through another cooling-air passage bore 46 also provided through the disk 40. Similarly, the disk 42 supporting the rotor blade 38 thereon is provided with a cooling-air passage bore 48, which is communicated with a second portion of the open space 45 formed between the disk 42 and the spacer disk 41 through another cooling-air passage bore 46 also provided to the disk 42.

The first and second portions of the open space 45 are communicated with each other through a hole 44 formed through the spacer disk 41, and one of which portions is communicated with the above-mentioned open space 28 in the torque tube 22 through an air passage bore 43 provided through the disk 40.

Now, with reference to FIGS. 1, 2, 3A and 3B, an explanation will be given the operation of the gas turbine of the above described embodiment of the present invention.

As before mentioned, a major portion of the compressed air A from the compressor 2 is introduced into combustors 3 and consumed to burn fuel in the combustors 3, and the combustion gas produced by the combustion of the fuel is guided to the turbine 4 to rotate the rotor blades 36 and 38 of the turbine and drive a power generator (not shown).

In the gas turbine according to the invention, it is devised that a portion of the compressed air A from the compressor 2 is guided into air cooling tubes 5. At the same time, water is jetted into the air cooling tubes 5 through nozzles 61, 62 and 63. While atomized fine particles of the jetted water are vaporized at the moment they are contacted with the compressed air being passed through inside the air cooling tube, compressed air is positively cooled by the latent heat of vaporization of the jetted water.

Although it may possibly occur that particles of water jetted from the nozzles 61, 62 and 63 are in part permitted to contact the inner wall surface of the air cooling tubes 5, the water droplets can be completely vaporized upon their contact with the wall surface, depriving the air cooling tube 5 of heat.

Thus, the portion of the compressed air A led from the combustor chamber 10 into the air cooling tube 5 is positively cooled by water jetted from nozzles 61, 62 and 63 and is then sent out from the tube 5 into the air cooling chamber 30 in the form of a cooling air C.

As stated above, the water jetted from nozzles 61, 62 and 63 is completely vaporized, and no portion thereof is permitted to flow in the form of water droplets out of the air cooling tube 5, so that various members and devices about the turbine inlet such as turbine blades 35, 36, 37 and 38, transition piece part 14 of the combustor and so forth can be prevented from undergoing a cracking likely when they are contacted by water droplets.

A portion of the cooling air C is supplied into the stator blades 35 and 37 and through the two air passage bores 34 provided through the turbine blade ring 33, and after it has cooled the turbine blades 35 and 37, it is flown into the main stream of the combustion gas.

A further portion of the cooling air C enters through small through-holes or bores 18 and 19 of the transition piece part 14 of the combustor into the main stream of combustion gas, and during its such course of flow, cools the outer cylinder and the inner cylinder 15 of the transition piece part 14.

A still further portion of the cooling air C passes through the extraction bores 25 and 26, the open space 28 in the torque tube 22 and the air passage bore 43, and then enters a first portion of the open space 45. Further, after it has passed through cooling-air passage bores 46 and 47 in the turbine blade disk 40 and cooled the rotor blade 36, it is flown into the main stream of the combustion gas. The portion of the cooling air C flown into the other portion of the open space 45 through the hole 44 bored through the spacer disk 41 passes through the cooling-air passage bores 46 and 48 of the turbine blade disk 42, and after it has cooled the rotor blade 38, it is flown out into the main stream of the combustion gas.

Water-jetting nozzles 61, 62 and 63 are of three separate or independent water supply systems, so that when the cooling water is required in only a small amount during operation of the turbine under a partially loaded condition, the supply of water to one or more of the water supply systems can be appropriately stopped to control the total amount of water to the required small one. In this manner, it is feasible to suppress to minimum the lowering of the pressure of the jetted water accompanying to a reduction of the supply amount of the cooling water and constantly maintain a desirable water jetting.

Figure 4:
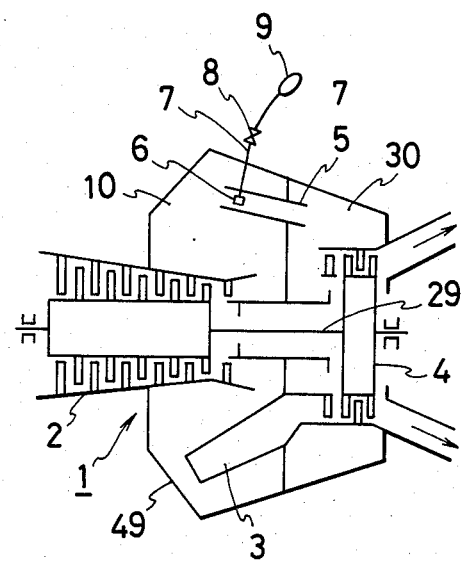
FIG. 4 is a schematic sectional view similar to FIG. 1 and shows a gas turbine according to another embodiment of the invention.

Further, the number of the water-supply systems is not limited to three, and if a first priority is to be given the simplicity, then a single water-supply system alone may be provided as shown in FIG. 4.

The gas turbine of the embodiment shown in FIG. 4 includes parts and members corresponding to those shown in FIG. 1, which are indicated by same reference characters as in FIG. 1, and the new reference numerals 6, 7 and 8 in FIG. 4 respectively represent a water injection nozzle, a pipe and a switching valve. Where it is made much of that the gas turbine should have a characteristic suitable for operation under partially loaded conditions, preferably the water-supply system should be as many as possible, and the number of the water-supply systems should be suitably determined selectively depending upon the particular characteristics desired of the gas turbine.

Figure 6:
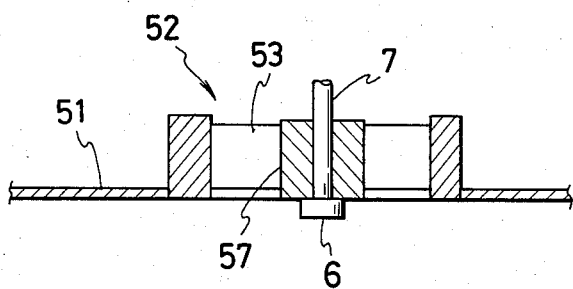
FIG. 6 shows a sectional view of a turning flow generator.
Figure 5:
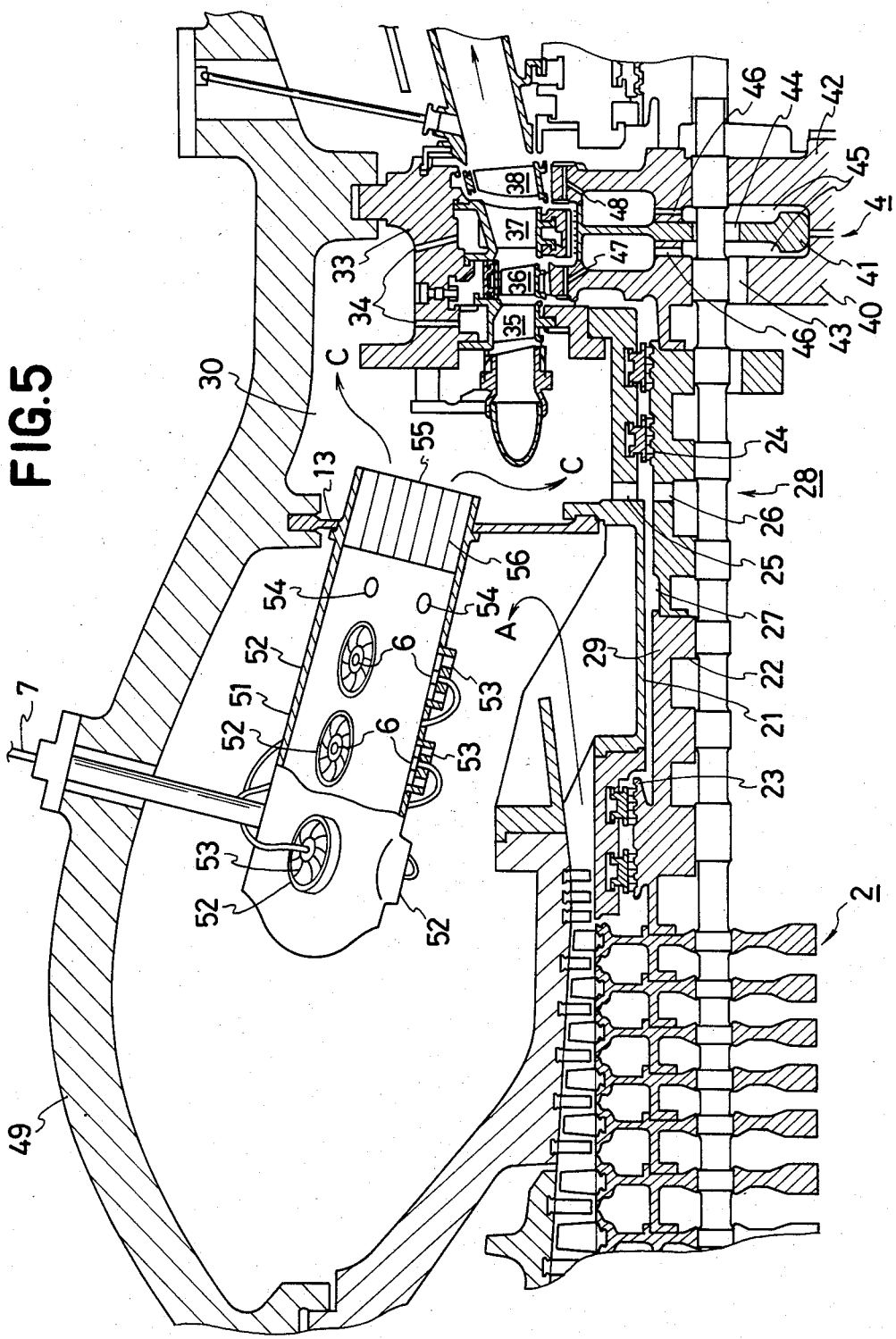
FIG. 5 is a sectional view in enlargement of essential portions of a gas turbine according to a still another embodiment of the invention.

FIG. 5 in conjunction with FIG. 6 represents a still another embodiment of the present invention and shows a gas turbine having an improved arrangement for the vaporization of water. As shown, the air cooling tube in this gas turbine, mounted through the partition wall 13 and indicated at 51, has a closed upstream end in the flow direction of gas in the turbine and an open downstream end or air outlet end.

Figure 7:
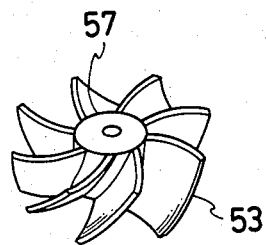
FIG. 7 is a perspective view of the turning flow generator of FIG. 6.

The air cooling tube 51 is provided with a plurality of air inlet openings 52 arranged at prescribed intervals around the periphery and along the length thereof, as well as small openings 54 of a diameter smaller than that of the openings 52. In each air inlet opening 52, a turning flow generator 53 is secured, which is of a structure resembling a screw runner as shown in detail in FIG. 7 and has a water injection nozzle 6 provided in a central hub part 57 thereof. At the open downstream end, the air cooling tube 51 is provided with a vaporizer 55.

Figure 8:
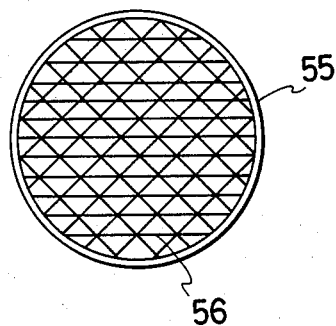
FIG. 8 is a front elevation of an evaporator.

As shown in FIG. 8, the vaporizer 55 comprises thin plates or strips 56 of for example a metal arranged in a grid or network structure, but this is not limitative and the vaporizer 55 may alternatively be made of a punched plate, metal netting or any other member insofar as it is not causative of a great pressure loss, essentially.

In the case of this embodiment, the compressed air A entering the air cooling tube 51 through the air inlet openings 52 is imparted with a turning or swirling motion by the function of the turning flow generator 53 and can be homogeneously mixed at rapidity with fine atomized water jetted out of each nozzle 6, whereby vaporization of water can be accelerated or promoted.

Compressed air A can enter the tube 51 also through the small openings 54, therefore the mixing together of the compressed air and the jetted water inside the tube 51 can be further promoted as well as the vaporization of the water. Any portion of the jetted water particles which have not been vaporized through the path through the pipe 51 can be captured at the vaporizer 55 at the downstream end of the pipe and vaporized thereat.

It is to be understood that the scope of the present invention is not limited to the specific embodiments described above and illustrated in the accompanying drawings, various changes and modifications being thought to be apparent to those skilled in the art without departing from the concept of the invention.

We claim:

1. A gas turbine comprising a compressor, a turbine, a turbine rotor, a plurality of combustors radially arranged around said rotor in a combustion chamber encased by a turbine casing, wherein each of said combustion chambers is internally divided along its longitudinal length by a partition wall disposed radially on a boundary between a combustor part and a transition piece part of each of said combustors so as to form a cooling air chamber axially disposed on the side of said transition piece part, said partition wall being provided therethrough with a number of longitudinally extending cylindrical air cooling tubes arranged radially around said rotor, each of said cylindrical air cooling tubes being in communication with said combustion chamber and said cooling air chamber with a major portion of the length thereof projecting in said combustion chamber, and further being provided with at least one water jetting nozzle; said turbine casing having secured thereto a turbine blade ring, having a plurality of stator blades secured thereto, and formed with an air passage bore therein communicating said cooling air chamber with the interior of said stator blades secured to said turbine blade ring; said transition piece part being provided with air passage holes for communicating the interior thereof with said cooling air chamber.

2. A gas turbine as claimed in claim 1, wherein each of said air cooling tubes is provided at a downstream end portion thereof with a vaporizer having a grid structure.

3. A gas turbine comprising a compressor, a turbine, a turbine rotor and a plurality of combustors radially arranged around said rotor in a combustion chamber encased by a turbine casing, wherein said combustion chamber is internally divided along its longitudinal length by a partition wall disposed radially on a boundary between a combustor part and a transition piece part of each of said combustors so as to form a cooling air chamber disposed axially on the side of said transition piece part, said partition wall being provided therethrough with a plurality of cylindrical air cooling tubes arranged radially around said rotor, each of said cylindrical air cooling tubes being in communication with said combustion chamber and said cooling air chamber and having a major portion of the length thereof projected in said combustion chamber, and further being provided with a plurality of water jetting nozzles; and wherein during operation of the turbine under partially loaded conditions, said plurality of water jetting nozzles in each air cooling tube can be successively made inoperative in accordance with a change in a load on the turbine.

* * * * *